US006698051B2

United States Patent
Hutton

(10) Patent No.: US 6,698,051 B2
(45) Date of Patent: Mar. 2, 2004

(54) AUTOMATICALLY RETRACTING PASSENGER LOADING BRIDGE

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/354,053

(22) Filed: Jan. 30, 2003

(65) Prior Publication Data

US 2003/0145403 A1 Aug. 7, 2003

Related U.S. Application Data

(60) Provisional application No. 60/352,846, filed on Feb. 1, 2002.

(51) Int. Cl.[7] .................................................. E01D 1/00
(52) U.S. Cl. ............................................................ 14/71.5
(58) Field of Search ............................... 14/69.5, 71.1, 14/71.3, 71.5; 701/1

(56) References Cited

U.S. PATENT DOCUMENTS

| | | | | |
|---|---|---|---|---|
| 3,543,318 A | * | 12/1970 | Tushim | 14/71.5 |
| 3,599,262 A | * | 8/1971 | Carder et al. | 14/71.5 |
| 3,683,440 A | * | 8/1972 | Xenakis et al. | 14/71.5 |
| 3,694,724 A | * | 9/1972 | Eggert, Jr. | 318/648 |
| 5,105,495 A | * | 4/1992 | Larson et al. | 14/71.5 |
| 5,226,204 A | | 7/1993 | Schoenberger et al. | |
| 5,257,431 A | | 11/1993 | Larson et al. | |
| 5,505,237 A | * | 4/1996 | Magne | 141/388 |

FOREIGN PATENT DOCUMENTS

| | | | |
|---|---|---|---|
| FR | 2 573 723 | * | 5/1986 |
| WO | WO 96/08411 A1 | | 3/1996 |

* cited by examiner

*Primary Examiner*—Gary S. Hartmann
(74) *Attorney, Agent, or Firm*—Freedman & Associates

(57) ABSTRACT

A system for automatically retracting a passenger loading bridge from an engaged position relative to an aircraft having a door, the aircraft being releasably connectable to a service provider is disclosed. The system comprising at least a sensor for detecting one of a plurality of predetermined events other than a user input at an input device coupled thereto and for providing a signal in dependence upon said detected predetermined events; and a bridge actuator in operative communication with the at least a sensor for receiving the signal and for automatically performing a retraction movement in order to retract the bridge from the aircraft in response to the signal indicative of one of the plurality of predetermined events being sensed.

11 Claims, 5 Drawing Sheets

Fig. 3a
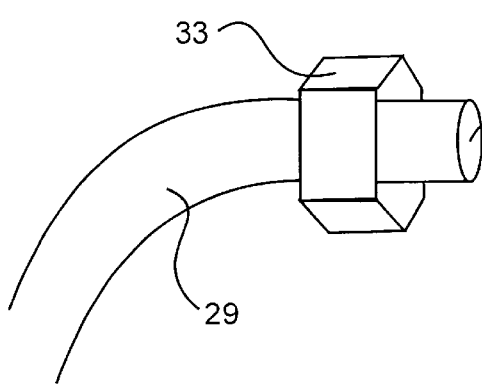
Fig. 3b
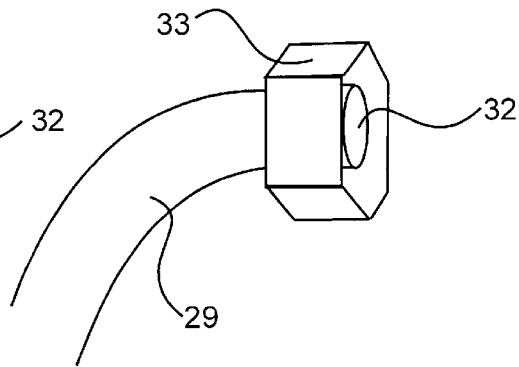
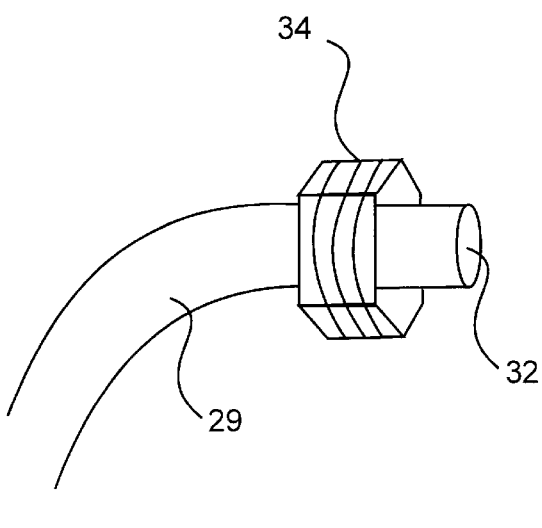
Fig. 4a
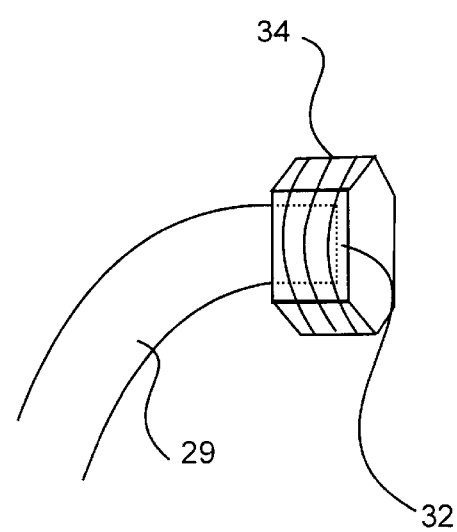
Fig. 4b

AUTOMATICALLY RETRACTING PASSENGER LOADING BRIDGE

This application claims priority from U.S. Provisional Application Serial No. 60/352,846 filed Feb. 1, 2002.

FIELD OF THE INVENTION

The present invention relates to passenger loading bridges and more particularly to a system for automatically retracting a passenger loading bridge to a predetermined standby position.

BACKGROUND OF THE INVENTION

Aircraft passenger loading bridges are used to convey people between an airport building and a parked aircraft in order to provide a sheltered access passageway for the aircraft passengers while boarding or deplaning. Advantageously, a passenger loading bridge also provides a path protected from weather and other environmental influences.

The passenger loading bridges used are telescopically extendable and height adjustable. Passenger loading bridges in present day use comprise a plurality of adjustable modules, including: a rotunda, a telescopically extendable tunnel, a bubble section, a cab, and elevating columns with wheel carriage. Some bridges have a fixed length and are pivotable radially about a fixed pivot between a stowed position and an aircraft engaging position, some bridges are telescopically extendable longitudinally and are pivotable radially about a fixed pivot and some bridges have a fixed length and are mounted on a stationary pedestal. An aircraft engaging cab is mounted on the distal end of each of the aforementioned types of bridges.

Typical longitudinally telescopically extendable bridges include two or three telescopically extendable tunnel sections, which are rectangular in cross-section, the inner one of which is supported by a rotunda arranged to provide passage to and from the terminal through a door or gate and the outer tunnel by a drive unit which can position the outer end of the bridge adjacent a door of the parked aircraft. Advantageously, the modular design of prior art passenger loading bridges allows a bridge operator to adjust the length of the bridge, which is achieved by extending or retracting the telescopically extendable tunnel sections. These adjustments are needed in order to service a wide range of aircraft models for a number of reasons, including the provision of a clear, unimpeded path for parking of the aircraft, accommodation of variations in the length of various aircraft types and the location of the passenger door thereon or different doors on a given type of aircraft.

In addition to compensating for different sized aircraft, the operator must also adjust the bridge position so as to correct for imprecise parking of the aircraft at the airport terminal. Typically, the bridge operator uses a control panel located within the cab section to adjust the bridge every time a flight arrives, as described in U.S. Pat. No. 5,761,757 to Mitchell.

Each type of bridge has a mechanism for allowing an operator to adjust the vertical height of the cab at the distal end of the bridge such that the cab engages the doors of different types of aircraft at a proper location. An operator operates the height adjust by a control in the cab. Some bridges have a motor control, which incorporates a joystick. The joystick enables an operator to control the motor to raise or lower the cab by moving the joystick forward or backward. With some systems, the operator must visually determine the proper position of the cab with respect to an aircraft door and move the joystick until the mechanism has moved the cab to the proper position.

In U.S. Pat. No. 5,226,204 to Schoenberger et al., a tele-robotic passenger loading bridge control system is disclosed. An operator sees a target vehicle either directly or through video cameras, and guides the passenger loading bridge to mate with the target vehicle through commands to an on-board computer via a combination of input/output devices such as joysticks, menus, and buttons. By using a tele-robotic approach, the system is designed such that the operator can control the passenger loading bridge either locally or at a remote site.

However, as is apparent to a person with skill in the art, it is a disadvantage of prior art passenger loading bridge systems that, after the passengers have deplaned or boarded the aircraft, a process which often takes quite a bit of time, a bridge operator must return to the control panel located within the cab section or at a remote site to disengage the passenger loading bridge and return it to a 'stowed' position until it is required for further use with another aircraft. As such, bridge operators are paid to perform a very routine operation of stowing the passenger loading bridge, which operation often involves considerable waiting time during which the operator is idle. This also infers an enormous schedule management of the operators in an airport to ensure that the operator schedule does not affect availability for performing the tasks when a boarding bridge is to be maneuvered to a stowed position.

The Patent No. WO 9608411 to FMT International Trade AB overcomes drawbacks of the prior art by automatically returning the passenger loading bridge to its parking position after the aircraft has left the stand. Inconveniently, if an individual is still in the bridge when the aircraft begins its motion, the jerk induced to the bridge can be harmful to the person. This is also potentially dangerous for the aircraft that can be damaged because of the existence of the contact with the bridge.

It would be advantageous to provide a system that allows an automatic retraction of a loading bridge prior to the aircraft. Furthermore, the system should be sensitive to any motion from the aircraft to automatically retract in order to protect either a person still in the bridge or the aircraft itself from damage.

OBJECT OF THE INVENTION

Therefore, it is an object of this invention to provide a system for retracting a passenger loading bridge from an aircraft after passenger boarding or deplaning is complete, absent bridge operator intervention.

It is a further object of the present invention to provide a system for controlling an automatic retraction of a passenger loading bridge along with an automatic switch off of other devices connected to the aircraft.

It is another further object of the present invention to provide a method of automatically retracting a passenger loading bridge from an aircraft after passenger boarding or deplaning is complete.

SUMMARY OF THE INVENTION

In accordance with a preferred embodiment of the present invention, there is provided a system for automatically retracting a passenger loading bridge relative to a door of an aircraft comprising: a retraction initiator for providing a control signal indicative of a passenger loading bridge retraction request prior to the aircraft moving substantially from a parking location adjacent the passenger loading bridge; a bridge controller in operative communication with the retraction initiator for receiving the control signal therefrom, for determining a movement for moving the passenger loading bridge from a first position in which a cabin end of the passenger loading bridge is mated with the door of the aircraft toward a second position in which the cabin end of the passenger loading bridge is other than mated with the door of the aircraft, and for providing a second signal indicative of the determined movement; and, a bridge actuator in operative communication with the bridge controller for receiving the second signal therefrom and for automatically performing the determined movement of the passenger loading bridge.

In accordance with another preferred embodiment of the present invention, there is provided a system for automatically retracting a passenger loading bridge from an engaged position relative to an aircraft having a door, the aircraft being releasably connectable to a service provider, the system comprising: at least a sensor for detecting one of a plurality of predetermined events other than a user input at an input device coupled thereto and for providing a signal in dependence upon said detected predetermined events; and a bridge actuator in operative communication with the at least a sensor for receiving the signal and for automatically performing a retraction movement in order to retract the bridge from the aircraft in response to the signal indicative of one of the plurality of predetermined events being sensed.

In accordance with another preferred embodiment of the present invention, there is provided a method of retracting a passenger loading bridge from an engaged position relative to an aircraft having a door comprising the steps of: receiving data indicative of a passenger loading bridge retraction request while the bridge is engaged to the aircraft and prior to the aircraft moving substantially from an engaged position to a second position other than an engaged position; determining a retraction movement for moving the passenger loading bridge toward the second position; and, automatically performing the determined retraction movement of the passenger loading bridge.

BRIEF DESCRIPTION OF THE DRAWINGS

Exemplary embodiments of the invention will now be described in conjunction with the following drawings, in which:

FIG. 3a is an illustration of an example of a coated nozzle in a supplying state;

FIG. 3b is an illustration of the coated nozzle of FIG. 3a in a state other than a supplying state;

FIG. 4a is an illustration of an example of a nozzle equipped with an ejecting means, the nozzle in a supplying state;

FIG. 4b is an illustration of the nozzle of FIG. 4a in other than a supplying state;

DETAILED DESCRIPTION OF THE INVENTION

According to the instant invention, when the transit of passengers from an aircraft to a terminal building or from the terminal towards the aircraft is finished, the passenger loading bridge having been aligned previously with an aircraft door is retracted automatically. The automatic retraction of the bridge is achieved absent intervention of a bridge operator. Furthermore, according to an embodiment when movement of the aircraft indicative of the aircraft leaving its parked position is detected, the retraction of the loading bridge is automatically engaged along with an automatic switch off of other devices connected to the aircraft.

Figure 1:
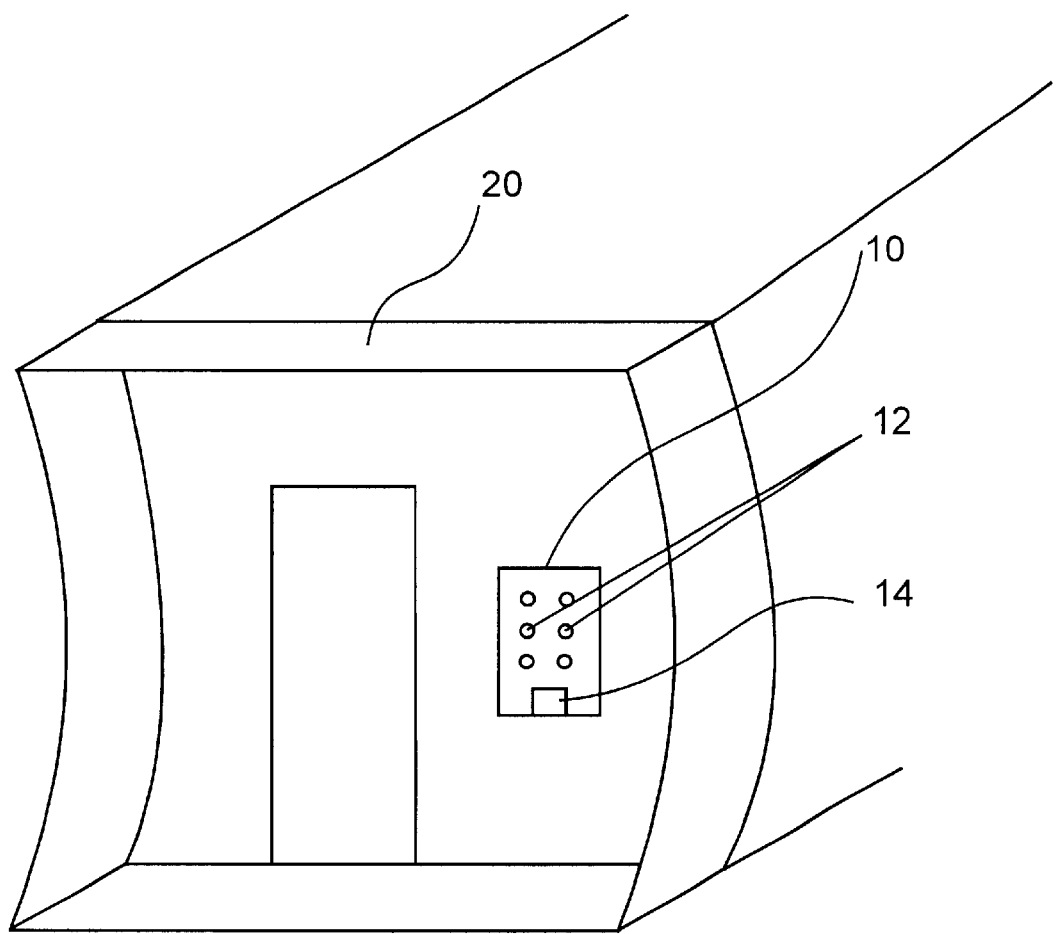
FIG. 1 is a schematic illustration of a control panel for controlling the retraction of a passenger loading bridge according to the present invention.

Referring to FIG. 1, shown is a schematic illustration of a control system for controlling the automatic retraction of a passenger loading bridge. In this embodiment, the automated retraction of the bridge is initiated from a bridge controller 10 that is located for example in the cab section 20 of the passenger loading bridge. The bridge controller 10 comprises a series of push buttons 12 for typing a code signaling, for example, that all the passengers on the boarding list have boarded the aircraft, that the doors of the plane are about to be closed, or that the plane is ready to depart. A practical location of such a bridge controller is close to the aircraft door such that a flight attendant can easily reach the buttons for typing in the code for initiating the automatic retraction of the bridge and the repositioning of the bridge to a stowed location. To prevent any jeopardy to the flight attendant, the automatic retraction of the bridge is not effective immediately after the code is entered; it is delayed by a period of time sufficient to allow the flight attendant to return safely inside the aircraft and also for securing the aircraft door prior to the commencement of the bridge retraction sequence. Alternatively, the delay is variable and is determined based on a state of the aircraft door being open or closed.

Optionally, the bridge controller 10 also comprises a sensor to detect motion within the passenger loading bridge, in order to prevent an automatic retraction of the passenger loading bridge until none is moving within the passenger loading bridge if someone inadvertently types in the right code for retracting the bridge.

Optionally, the bridge controller 10 also comprises a security device 14 such as for example a smart card reader or biometric sensor, or any other convenient security device, in order to prevent an automatic retraction of the passenger loading bridge if someone inadvertently types in the right code for retracting the bridge.

Optionally, the control panel is located at the terminal end of the bridge. Therefore, the airport employees who verify the boarding ticket of every passenger are responsible for entering a code indicative of a retraction request when all the passengers have been checked. However, this is not a preferred embodiment because the employee at the gate does not know when the passengers have completed boarding the aircraft. Therefore, the employee is not sure, absent a visual system installed in the bridge that the bridge is free of people and therefore is ready for retraction. Of course, when the passenger loading bridge is equipped with a motion sensor, the staff at the gate has an ability to check to see if anyone is moving on the passenger loading bridge prior to actuating a retraction thereof.

Further optionally, the cockpit of the aircraft is equipped with a transmitter in communication with the bridge controller. Therefore, from this location, an operator of the aircraft is responsible for transmitting a signal indicative of a retraction request to the bridge controller via the transmitter when the aircraft is ready to move from the parked position. Of course, the operator is mostly aware that the aircraft is in order to initiate a movement; however, the operator has probably no indication of the conditions of the bridge, about the occupation of the bridge for example. Of course, when the passenger loading bridge is equipped with a motion sensor, the staff at the gate has an ability to check to see if anyone is moving on the passenger loading bridge prior to actuating a retraction thereof.

Figure 2:
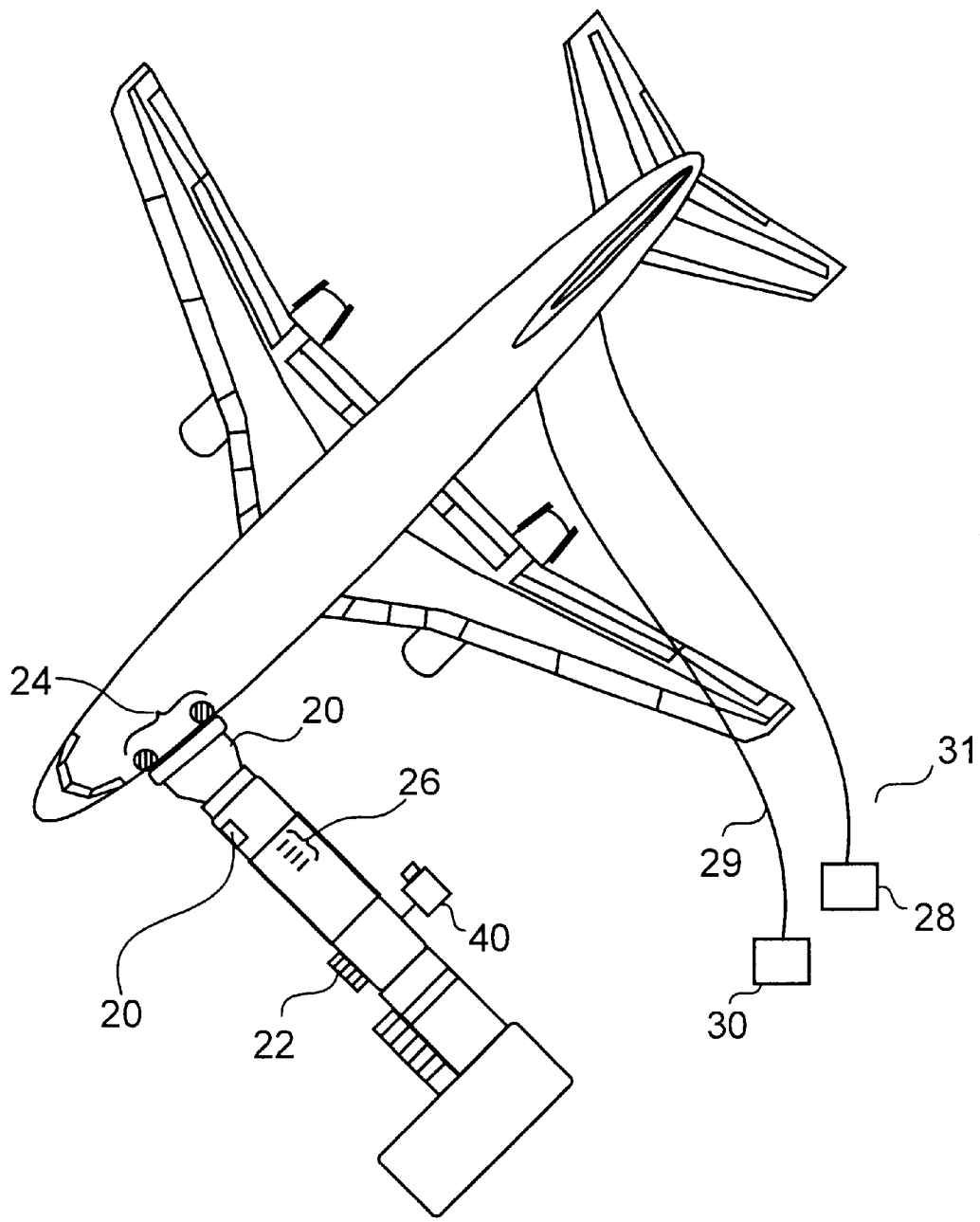
FIG. 2 is a schematic illustration of a plurality of connections of a plurality of devices connected to an aircraft.

As shown in FIG. 2, when parked, an aircraft is connected to many different devices other than the passenger loading bridge, in particular a fuel supplier pipe 29 controlled by a fuel controller 30, a current supplier line 31 for loading AC batteries under the command of the AC controller 28. The bridge controller is in communication with the fuel controller 30 and the AC controller 28. When a request to retract is received by the bridge controller, the bridge controller sends a signal to the other devices such that they automatically switch off and their contact with the aircraft is automatically disrupted. By so doing, risks, for example a risk of electrocuting someone, are decreased, as well as the dangers associated with having fuel freely running out of a pipe and spreading on the tarmac because a fuel valve is left open prior to a movement of the aircraft. This provides an advantage by preventing the aircraft from leaving a parked position with the AC cables and/or the fuel nozzle still connected and supplying the aircraft.

In order to protect the external surface of the aircraft when the contact with the other devices is automatically disrupted, such devices are equipped with soft protection. FIG. 3a shows an example of a protected fuel nozzle 32 in a supplying state. The nozzle is wrapped up with an extendable/retractable protection coat as for example foam or a rubber coat 33 such that the coat is pressed in a retracted position for allowing a connection of the nozzle to a fuel tank. Advantageously, as shown in FIG. 3b, when the nozzle is disconnected from the fuel tank, the protection coat 33 extends to envelope the nozzle. The soft protection wraps up the parts of the nozzle that might be in contact with the external surface of the aircraft when the connection with the aircraft is disrupted for avoiding structural damages in the form, for example of deep scratches, which need to be fixed and therefore immobilized the aircraft.

Alternatively, the devices are equipped with ejection system as shown in FIGS. 4a and 4b. In FIG. 4a, a fuel nozzle 32, for example, is shown in a supplying state. The nozzle is wrapped up with a spring 34, which is maintained in a retracted position when the nozzle is connected to a fuel tank. FIG. 4b shows the nozzle in a non-supplying state wherein the spring 34 is in an extended position due to the disconnection with the aircraft. When the contact between the aircraft and the fuel supplier is disrupted, the spring ejects the nozzle away from the aircraft for avoiding any contact between the external surface of the aircraft with the nozzle.

Optionally, the nozzle and the ejection system are both wrapped up with a soft protection for preventing the nozzle to get damaged when it falls on the ground after the ejection. Of course, such protection is preferable in order also to protect other devices on the ground, and eventually ground staff, from the falling ejected nozzle.

As a further security mechanism, the area of the bridge contacting the aircraft, i.e., bumpers and canopy at the contacting end of the bridge are equipped with contact sensors 24, which detect for example a rupture in the contact between the bridge and the aircraft. When such a rupture is detected, it is most probably indicative of a motion of the aircraft relative to the bridge. The bridge controller receives information from the contact sensors when they detect a rupture in the contact; an immediate response from the bridge controller is to send a retraction signal to the bridge actuator 22. At the same time, the bridge controller also sends a signal to the fuel and electrical controllers such that they switch to immediately terminate any supply therefrom. Advantageously, automatically disengaging the bridge as soon as a motion of the aircraft is detected decreases the risk of harming a person still in the bridge at the moment of the jerk occasioned by a collision of the bridge and the aircraft. Optionally, a visual system 40 is used to determine a "best" course of retraction for the passenger loading bridge in order to eliminate or reduce damage to the aircraft. Preferably, such a system also accounts for and protects the lives of individuals working on the tarmac and located within the plane and the bridge.

Further advantageously, automatically disengaging the passenger loading bridge also decreases the potential damages occasioned to the aircraft if it strikes the loading bridge while moving away from its parked position. Such incident might signify a costly immobilization of the aircraft. Of course, a sensor system for use in determining a path for retracting the passenger loading bridge further enhances this advantage.

Optionally, if the bridge controller has to secure other devices, an alarm system is also automatically activated at the ground level and/or a signal is transmitted to the cockpit such that the aircraft is warned to stop for allowing further verifications, as for example closing the gas tank door.

Figure 5:
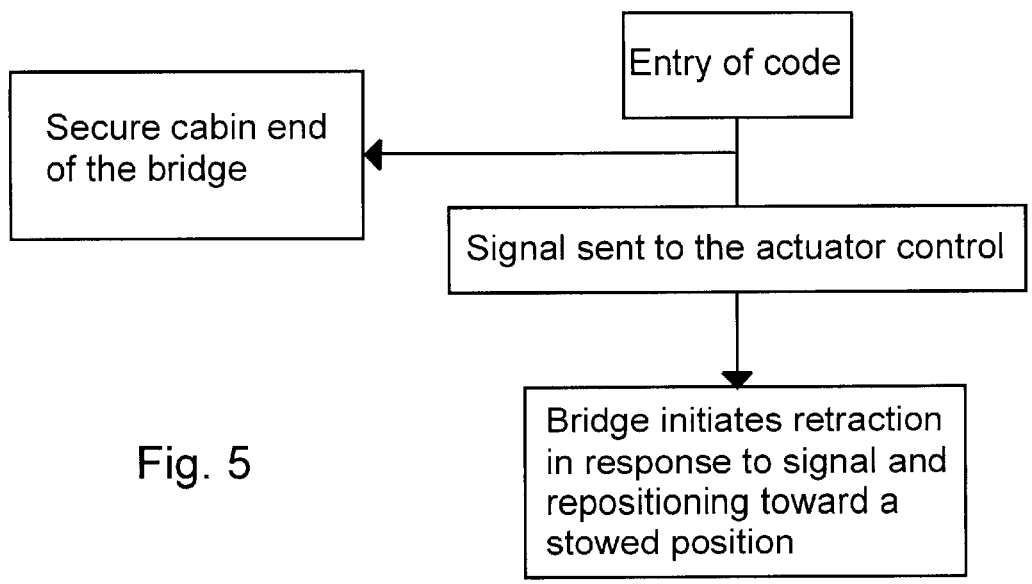
FIG. 5 is a flow diagram of a method of automatically retracting a passenger loading bridge according to the present invention.

Referring to FIG. 5, a method of automatically retracting the bridge is shown. A flight attendant or any other authorized employee enters a code on the bridge controller indicating that the bridge should disengage the aircraft door; a signal indicative of an automatic retraction is generated and sent to an actuator control of the bridge. The retraction and the repositioning of the bridge towards a stowed location are initiated after a delay sufficient for the flight attendant to leave the cab section of the bridge.

Optionally, before initiating the retraction of the bridge, the end section of the bridge which mates with the door of the aircraft is secured, for example by automatically closing a door of the end section in order to prevent any accident that may happen if a late passenger is rushing, expecting to board while the retracting movement is already engaged. A closed door at the end of the bridge will prevent the passenger from falling off the bridge and onto the tarmac.

Figure 6:
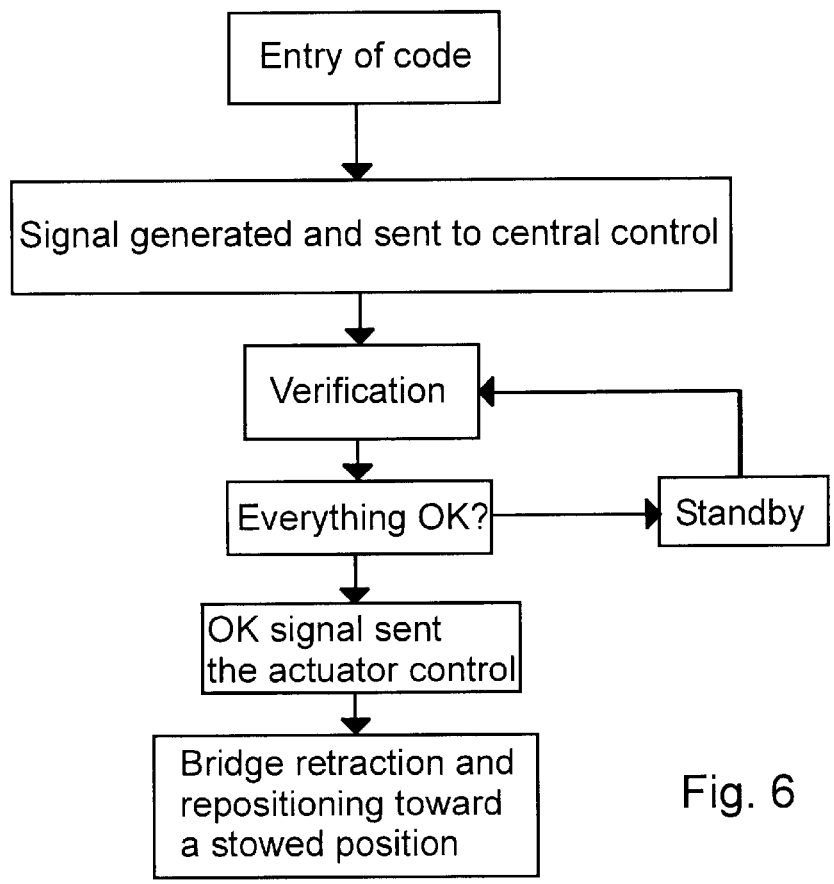
FIG. 6 is a flow diagram of another method of automatically retracting a passenger loading bridge according to the present invention; and, FIG. 7 is a flow diagram of another method of automatically retracting a passenger loading bridge according to the present invention.

Referring to FIG. 6, another method for automatically retracting the bridge is shown. In this embodiment, a flight attendant or any other authorized employee enters a code in the bridge controller, optionally the code is associated with security information in the form, for example of a fingerprint; the flight attendant should therefore provide security information to a security device incorporated in the controller. The bridge controller receives information from various devices as for example sensors 26 installed in the bridge for detecting the presence of people. In response to the received information, i.e. the code, the security information and the sensor information, the bridge controller generates a signal and transmits it to a central control, located for example in a control tower of the airport. The central control compiles the information received and performs verifications prior to communicating with a bridge actuator. The verifications comprise security clearance for example to authenticate the security information data entered concurrently with the code, and the absence of a person in the bridge detected by the sensors. The central control is most likely part of an airport network and therefore is in communication with many other systems and receives information from other sources in the form for example of a fuel supplier controller, or an AC supplier controller. When all the verification are done, and a clearance is obtained, the central control sends a signal to the bridge actuator which initiates a retracting movement of the bridge from a position wherein the cab section of the bridge is mating with the aircraft's door to a position of the bridge wherein the bridge is in a stowed location. A signal sent to the bridge actuator is indicative of an immanent departure of the aircraft; therefore a signal is also sent to other devices connected to the aircraft as for example a fuel controller and an electric controller for switching off the supply of fuel and electricity.

Optionally, the airport network provides to the bridge controller data relating to a next model of aircraft expected at the gate to which the passenger loading bridge is connected. Therefore, the bridge is retracted to a stand by position for the next model of aircraft, instead of being retracted to a stowed position and then moved all the way back out again for mating with the door of the next aircraft model. Advantageously, this would save time of adjustment when the next aircraft model arrives at the gate. Furthermore, this would be safer for ground crew.

Figure 7:
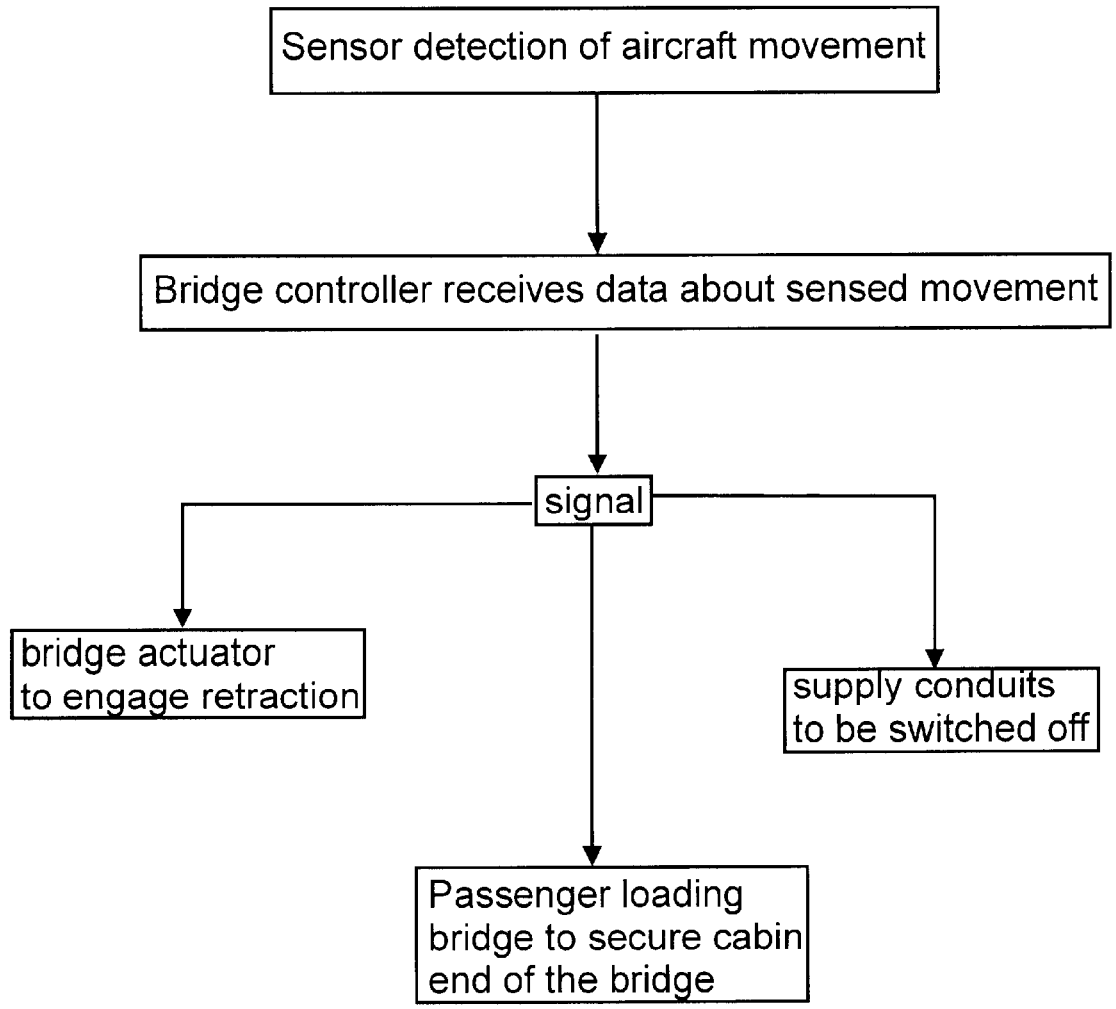

As shown in FIG. 7, a by-pass method of automatically retracting a passenger loading bridge exists wherein the extremity of the bridge that mates the area of the door of the aircraft is equipped with motion detectors. When the motion detectors detect a movement of the aircraft indicative of the aircraft leaving a parked position, the bridge controller is immediately notified and a signal is sent to the bridge actuator for engaging the retraction of the bridge. This is performed without a code entry from an employee. In order to maximize the security, the bridge controller also provides a signal for securing the bridge and automatically securing the end of the bridge that was in contact with the aircraft from access before the latter initiates a movement. Furthermore, the bridge controller sends a message to the other devices connected to the aircraft in order to switch off the supply of fuel and electricity, for example.

Of course, a vertical movement of the aircraft caused by an increase in weight while the loading the aircraft with passengers' luggage, or fuel supply for example is distinguished by the motion sensors such that the bridge controller notifies the bridge actuator for an immediate retraction only when the plane is leaving the parked position. However, the vertical movement is detected by the motion sensors and transmitted to the bridge controller such that the inclination of the bridge follows the vertical displacement of the door such that the end portion of the bridge still mates with the door of the aircraft.

Of course, an automated safety override system is provided, including proximity sensors within the passenger loading bridge to detect the presence of individuals, and additional sensors disposed on an outer surface of the passenger loading bridge to detect ground vehicles, buildings and individuals in the path of the bridge. A processor receives data from the sensors internal and external to the bridge structure, and stops or pauses bridge movement as required, in order to avoid causing injury or damage to individuals and property, respectively.

Numerous other embodiments may be envisaged without departing from the spirit and scope of the invention.

What is claimed is:

1. A system for automatically retracting a passenger loading bridge from an engaged position relative to an aircraft having a door, the aircraft being releasably connectable to a supply conduit, the system comprising:
    at least a sensor for detecting one of a plurality of predetermined events other than a user input at an input device coupled thereto and for providing a signal in dependence upon said detected predetermined events; and,
    a bridge actuator in operative communication with the at least a sensor for receiving the signal and for automatically performing a retraction movement in order to retract the bridge from the aircraft in response to the signal indicative of one of the plurality of predetermined events being sensed.

2. A system according to claim 1 comprising a transmitter in operative communication with the bridge actuator for receiving an actuation signal therefrom and for providing a second signal for initiating disconnection of the supply conduit from the aircraft.

3. A system according to claim 2, wherein the supply conduit includes a shut-off actuator for receiving the second signal from the transmitter, and for interrupting a provision of a service before or substantially coincident to a time of initiating the disconnection of the supply conduit from the aircraft.

4. A system according to claim 2, comprising a retraction warning signal generator in communication with the transmitter for receiving the second signal therefrom, and for providing a warming signal at a time before or substantially coincident with the retraction movement of the passenger loading bridge.

5. A system according to claim 4, wherein the retraction warning signal generator comprises at least one of a speaker for providing an acoustic warning signal and a light for providing a visual warning signal.

6. A system according to claim 2, comprising barricade means in communication with the transmitter for receiving the second signal, the barricade means moveable to a position for obstructing a cabin end of the passenger loading bridge during the retraction movement.

7. A system according to claim 1, wherein the at least a sensor comprises a safety sensor disposed for sensing individuals within the passenger loading bridge, and wherein a predetermined event includes actuation motion of the passenger loading bridge upon receiving a signal generated by the safety sensor indicative of one of an emptiness of the passenger loading bridge and of other than unauthorized individuals within a predetermined area of the passenger loading bridge.

8. A system according to claim 1, wherein the at least a sensor comprises a motion sensor disposed for sensing a movement of the aircraft from the engaged position and wherein a predetermined event includes retraction movement of the aircraft from the engaged position.

9. A system according to claim 1, comprises an actuator for automatically securing a passenger loading bridge cabin end mating with the door of the aircraft and wherein an action in response to the signal indicative of one of the plurality of predetermined events being sensed is to automatically secure a passenger loading bridge cabin end mating with the door of the aircraft.

10. A system according to claim 1, wherein the sensor comprises a sensor disposed for sensing objects along a path of the movement of the passenger loading bridge, and wherein an action, when an object is sensed, is to automatically delay the retraction movement of the passenger loading bridge.

11. A system according to claim 1, wherein the at least a sensor comprises a door sensor for detecting a state of the door of the aircraft, such that when the door is moved to a closed state the sensor provides a sensor signal indicative of a change in the aircraft door state to the bridge actuator, and an action, when a change in the aircraft door state is sensed, is to automatically initiating the retraction movement of the passenger loading bridge from the engaged position toward another position wherein a cabin end of the passenger loading bridge is other than mating with the aircraft door.

* * * * *